United States Patent Office 3,477,988
Patented Nov. 11, 1969

3,477,988
PREPARATION OF ORGANOPOLYSILOXANES BY SILOXANE REARRANGEMENT
Robert L. Ostrozynski, Lewiston, N.Y., assignor to Union Carbide Corporation, a corporation of New York
No Drawing. Filed Apr. 5, 1967, Ser. No. 628,557
Int. Cl. C08g 31/40; B01j 11/82
U.S. Cl. 260—46.5
66 Claims

ABSTRACT OF THE DISCLOSURE

Base-catalyzed rearrangements are promoted by organophosphorus compounds of the formula:

wherein Q is oxygen, sulfur or selenium, Y and Y' when taken together comprise an alkylene group and when taken separately are monovalent hydrocarbon groups, substituted monovalent hydrocarbon groups substituted with alkoxy, nitro, nitrile, nitroso, diarylamino or dialkylamino substituents, alkoxy groups, substituted alkoxy groups substituted with alkoxy, nitro, nitrile, nitroso, diarylamino or dialkylamino substituents, dialkylamino groups, diarylamino groups, substituted dialkylamino groups substituted with alkoxy, nitro, nitrile, nitroso, diarylamino or dialkylamino substituents, or substituted diarylamino groups substituted with alkoxy, nitro, nitrile, nitroso, diarylamino or dialkylamino substituents, W is selected from the class from which Y and Y' when taken separately are selected or is a group of the formula

wherein Y, Y' and Q are as defined above and R is divalent oxygen, a divalent hydrocarbon group, a divalent substituted hydrocarbon group substituted with alkoxy, nitro, nitrile, nitroso, diarylamino or dialkylamino substituents, a divalent polyoxyalkylene group, a divalent alkylene oxide group —R'O—, wherein R' is alkylene, or a divalent group of the formula

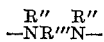

wherein R" is a monovalent hydrocarbon group or a substituted monovalent hydrocarbon group as defined above and R''' is a divalent hydrocarbon group or a divalent substituted hydrocarbon group as defined above and when R contains carbon the phosphorus atoms of said organophosphorus compound are joined through at least two carbon atoms; pyridine N-oxide; or $C_1$ to $C_4$ alkyl substituted pyridine N-oxides.

Typical promoters are hexamethylphosphoramide, phenyl-dimethylphosphine oxide, 1-ethyl-phospholane-1-oxide, cyclobutyl diethylphosphine oxide, bis-1,6-(dimethylphosphinyl) - hexane, 4 - (di-ethoxyphosphinoxy) butyl diethyl phosphate, butyl-N,N,N',N'-tetraethylphosphoramidate, butyl P-phenyl-dimethylphosphoramidate, n-octyl-dimethylthiophosphate, triphenyl phosphine selenide, di(n-butyl)-0-ethyl phosphinate, ethyl-0,0-di(n-butyl)phosphonate, triethyl phosphate, etc.

Cyclic and other low molecular weight polysiloxanes can be rearranged with or without end-blocking units, e.g., alkoxysilyl, trialkylsilyl, etc., to higher molecular weight polymers including gumstocks with or without olefinic or vinyl groups.

High molecular weight polysiloxanes, such as hydrolyzates, gums, or rubbers, can be arranged to lower polymers.

Alkoxy or aryloxysilanes can be present during rearrangement to provide alkoxy or aryloxy end-blocking groups.

Water present during rearrangement provides silanol groups. Alkanol present during rearrangement provides silicon-bonded alkoxy goups.

Fillers such as silica can be present without preventing rearrangement.

Certain promoters, e.g., those containing phosphorus-bonded alkoxy or aryloxy groups, are transient and permit thermal stabilization and control of degree of rearrangement.

Certain other promoters, e.g., phosphoramides and phosphine oxides, permit the use of barium and strontium bases as rearrangement catalysts.

This invention is directed to methods utilizing novel promoters for the preparation of a wide range of organopolysiloxanes by base-catalyzed siloxane rearrangement. One aspect of the invention relates to rearrangement or equilibration of low molecular weight organopolysiloxanes to form higher molecular weight organopolysiloxanes, such as, oils, resins, and gums, by contacting said low molecular weight material with a basic catalyst in the presence of an organophosphorus promoter or a pyridine N-oxide promoter. Another aspect of this invention involves the rearrangement or equilibration of high molecular organopolysiloxanes, e.g., gums, resins, oils, greases, gels, etc., to lower molecular weight materials such as cyclic trimers and tetramers or low molecular weight linear materials when the rearrangement is conducted in the presence of relatively large amounts of monofunctional siloxane units.

The invention is also directed to novel catalyst-promoter compositions useful in the rearrangement of organopolysiloxanes and to novel compositions containing catalyst, promoter and organopolysiloxane.

Other aspects of the invention will become clear from the following disclosure.

Heretofore, various organosulfur compounds had been used to promote base-catalyzed rearrangements as disclosed in U.S. Patents 3,175,994 and 3,175,995. Also, as shown in U.S. Patents 2,830,967 and 3,186,967 various organophosphorus nitrile derivatives had been used to catalyze per se in the absence of basic catalysts, the polymerization of organopolysiloxanes to high molecular weight polymers or copolymers. U.S. Patent 3,177,178 discloses the use of phosphorus halogen compounds in conjunction with hydroxy compounds, e.g., t-butanol, for catalyzing the conversion of low molecular weight cyclic organopolysiloxanes to higher molecular weight products. U.S. Patents 2,739,952 and 2,837,494 disclose the addition of organophosphorus compounds to organopolysiloxane oils, resins or rubbers resulting from a completed rearrangement of the purpose of providing stability against heat and moisture by inactivating the basic catalyst used to produce such oils, resins or rubbers. None of these patents, however, disclose or utilize the action of compounds of the type used in this invention in promoting base-catalyzed rearrangements.

It is well known that organopolysiloxanes can be prepared by rearrangement reactions in which the silicon to oxygen linkages are rearranged in a virtually random fashion. Rearrangement reactions of organopolysiloxanes are catalyzed by strong bases and strong acids. Catalyzed siloxane rearrangements are frequently used in the commercial preparation of higher molecular weight organopolysiloxanes from lower molecular weight organopolysiloxanes and vice versa.

Strong bases such as those set forth in Table A below are effective catalysts for siloxane rearrangements. But to obtain useful rates of siloxane rearrangement with these catalysts, temperatures from 100 to 200° C. are required. To supply, control and later to remove the heat required are costly and time consuming and, moreover, organopolysiloxanes bearing heat sensitive organic groups can be damaged or destroyed at such elevated temperatures.

TABLE A.—TYPICAL BASE CATALYSTS FOR SILOXANE REARRANGEMENTS

| Alkali Metal Bases: | |
|---|---|
| Lithium | Oxides. |
| Sodium | Hydroxides. |
| Potassium | alkoxides and aryl oxides (e.g., methoxide, ethoxide, phenoxide). |
| Rubidium | ⎫ Silanolates (e.g., dimethyl-silano- |
| Cesium | ⎭ late). |
| Quarternary Bases: | |
| Tetraalkylammonium | Hydroxides. |
| Tetralkylphosphonium | ⎫ Alkoxides. |
| Trialkylhydrazinium | ⎭ |
| Trialkylguanidinium | Silanolates. |

The quaternary bases, e.g., the tetraalkylammonium, tetraalkylphosphonium, trialkylhydrazinium and trialkylguanidinium hydroxides, alkoxides and silanolates, have the feature of being decomposable at elevated temperatures into catalytically inactive, volatile substances which are easily removed from the organopolysiloxane product. Unfortunately, they also suffer from the disadvantage of decomposing at appreciable rates at the temperatures heretofore required to attain useful rates of siloxane rearrangement and, consequently, their concentrations and hence their catalytic effects diminished throughout the reaction period unless replenished by periodic or continual addition of new base.

The alkali metal base catalysts, e.g., the alkali metal oxides, hydroxides, alkoxides, aryloxides, and silanolates, heretofore required comparatively higher temperatures to achieve useful rates of siloxane rearrangement than the quaternary base catalysts. The temperatures required may be so high that cleavage of organic substituents from silicon becomes appreciable and produces undesirable branching, cross-linking and even unwanted gelation in the organopolysiloxane product.

Unlike the quaternary bases, the alkali metal base catalysts are quite stable to heat and remain persistent in their action. In consequence, thermally stable organopolysiloxane rearrangement products cannot be made unless the alkali metal base catalysts are chemically neutralized, decomposed or physically separated by costly additional steps.

Furthermore, the high temperatures required with the alkali metal base catalysts, and to some extent also with the quaternary base catalysts, make it difficult to retain components that have high vapor pressures or boil under such conditions.

The invention disclosed herein provides, in one aspect, a process for greatly increasing the rates of base-catalyzed siloxane rearrangements both within the heretofore conventional temperature range of 100–200° C. and at much lower temperatures so that useful rates of rearrangement are achieved at temperatures as low as 25° C. and even lower.

A suitable and practical criterion for defining a useful rate of rearrangement is the time required to convert low molecular weight organopolysiloxanes to higher polymers. Rearrangement rates are considered to be useful when such higher polymers can be prepared within a span of eight hours or less. A particularly convenient but in no way limiting procedure for measuring the rate of siloxane rearrangement is the time required for the conversion of a low molecular weight cyclosiloxane such as octamethylcyclotetrasiloxane, to a high molecular weight linear polydimethylsiloxane of at least $10^6$ centipoises viscosity. In most cases, catalyst concentration and reaction temperature can, of course, be adjusted, individually or together, to provide useful rearrangement rates; however, these parameters have limitations. As stated hereinabove, excessive temperatures and catalyst concentrations have a deleterious effect on the chemical and physical properties of the final polymer.

This invention further provides base-catalyzed organopolysiloxane compositions which exhibit useful rates of rearrangement at temperatures appreciably below the heretofore conventional range of 100–200° C. and which exhibit greatly increased rates of siloxane rearrangement within the usual temperature range of 100–200° C. as compared to the corresponding conventional strong base-catalyzed organopolysiloxane compositions.

This invention further provides novel promoter-catalyst compositions which are effective in producing useful rates of siloxane rearrangements at temperatures below the usual range of 100–200° C. and which are effective in producing greatly increased rates of siloxane rearrangements within the temperature range from 100–200° C.

This invention further provides novel promoter-catalyst compositions containing quaternary bases which are effective in producing useful rates of siloxane rearrangements at temperatures below those at which the quaternary bases normally decompose at an appreciable rate.

This invention further provides novel promoter-catalyst compositions which are effective in producing accelerated rates of siloxane rearrangement and which are self-deactivating in that the promoter-catalyst composition components are converted by reaction among themselves to form inactive, non-catalytic products and thereby permit the formation of rearranged organopolysiloxane products which are inert to further siloxane rearrangements induced by heat alone.

This invention further provides catalyzed organopolysiloxane compositions which are susceptible to siloxane rearrangement for a limited period of time and thereafter become inert to further rearrangement.

This invention further provides an improved process of forming cyclic siloxanes, useful as intermediates, from linear organopolysiloxanes.

This invention further provides a process for reclaiming cured silicone gums and rubbers.

This invention further provides a process for making organopolysiloxanes containing hydroxysilyl groups and a process for making organopolysiloxanes containing alkoxysilyl groups.

This invention also provides a process for carrying out base-catalyzed rearrangements in the presence of fillers such as silica.

This invention also provides a rearrangement process utilizing bases as catalysts which heretofore were inactive in catalyzing rearrangements.

The term "promoter" is used herein to designate the organic compounds which have been discovered to possess the unexpected property of greatly increasing the rate of siloxane rearrangements catalyzed with the above-described alkali metal bases or quaternary bases. These promoters are (A) organophosphorus compounds of the formula:

wherein Q is selected from the class consisting of oxygen, sulfur and selenium, Y and Y' when taken together comprise an alkylene group of 2 to 18 carbon atoms and when taken separately each contains no more than 18 carbon atoms and are each selected from the class consisting of monovalent hydrocarbon groups, substituted monovalent hydrocarbon groups substituted with a substituent from the class consisting of alkoxy, nitro, nitrile, nitroso, diarylamino and dialkylamino substituents, alkoxy groups, substituted alkoxy groups substituted with a substituent from the class consisting of alkoxy, nitro, nitrile, nitroso, diarylamino and dialkylamino substituents, dialkylamino groups, diarylamino groups, substituted dialkylamino groups substituted with a substituent from the class consisting of alkoxy, nitro, nitrile, nitroso, diarylamino and dialkylamino substituents, and substituted diarylamino groups substituted with a substituent from the class consisting of alkoxy, nitro, nitrile, nitroso, diarylamino and dialkylamino substituents, W is a group selected from the class consisting of the class from which Y and Y' when taken separately are selected and a group of the formula

wherein Y, Y' and Q are as defined above and R is a member of the class consisting of divalent oxygen, divalent hydrocarbon groups of 2 to 12 carbon atoms, divalent substituted hydrocarbon groups of 2 to 12 carbon atoms substituted with a substituent from the class consisting of alkoxy, nitro, nitrile, nitroso, diarylamino and dialkylamino substituents, divalent polyoxyalkylene groups of 2 to 12 carbon atoms, divalent alkylene oxide groups, —R'O—, wherein R' is alkylene of 2 to 12 carbon atoms, and divalent groups of the formula

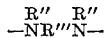

wherein R'' is selected from the class consisting of monovalent hydrocarbon groups and substituted monovalent hydrocarbon groups as defined above and R''' is a divalent group from the class consisting of divalent hydrocarbon groups and divalent substituted hydrocarbon groups as defined above and when R contains carbon the phosphorus atoms of said organophosphorus compound are joined through at least two carbon atoms; (B) pyridine N-oxide; and (C) $C_1$ to $C_4$ alkyl substituted pyridine N-oxides.

Typical examples of such promoters are triethylphosphine oxide, $(Et)_3P(O)$;
tri-n-butylphosphine oxide, $(n-Bu)_3P(O)$;
tri-n-butylphosphine sulfide, $(n-Bu)_3P(S)$;
triphenyl phosphine oxide, $(Ph)_3P(O)$;
triphenyl phosphine selenide, $(Ph)_3P(Se)$;
phenyldimethylphosphine oxide, $(Ph)(Me)_2P(O)$;
phenyl n-butyl ethyl phosphine oxide, (Ph)(n-Bu)(Et)P(O)

1-ethyl-phospholane-1-oxide,

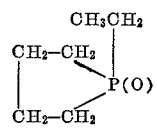

cyclobutyldiethylphosphine oxide, $(C_4H_7)(Et)_2P(O)$;
bis-1,6-(dimethylphosphinyl)hexane,

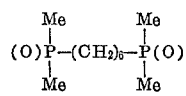

tris[2-(di-n-butylphosphinyl)ethyl] phosphine oxide,

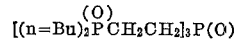

di-n-butyl-0-ethyl phosphinate, $(n-Bu)_2(EtO)P(O)$;
ethyl-0,0-di-n-butyl phosphonate, $(Et)(n-BuO)_2P(O)$;
tri-n-butyl phosphate, $(n-BuO)_3P(O)$;
n-octyl-dimethylthiophosphate, $(n-OctO)(MeO)_2P(S)$;
4-(diethoxyphosphinoxy)butyl diethyl phosphate,

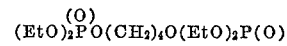

diethyl-N,N-dimethylphosphinamide, $(Et)_2(Me_2N)P(O)$;
P-phenyl-tetramethylphosphonamide, $(Ph)(Me_2N)_2P(O)$;
hexamethylphosphoramide, $(Me_2N)_3P(O)$;
N,N-dibutyl-tetramethylphosphoramide, $(Bu_2N)(Me_2N)P(O)$ diethyldimethylphosphoramidate, $(EtO)_2(Me_2N)P(O)$;
butyl-N,N,N',N'-tetraethylphosphordiamidate, $(BuO)(Et_2N)_2P(O)$ butyl P-phenyl-dimethylphosphonamidate, $(Ph)(BuO)(Me)_2NP(O)$ pyridine N-oxide,

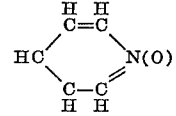

gamma-picoline N-oxide,

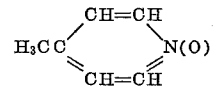

and the like.

Preferred promoters are the organophosphorus compounds as defined above and especially preferred are those of the formulas:

$$R_3''''P(Q) \qquad \text{II}$$
$$(R_2''''N)_3P(Q) \qquad \text{III}$$

and $$(R''''O)_a(R'''')_b(R_2''''N)_cP(Q) \qquad \text{IV}$$

wherein R'''' is a monovalent hydrocarbon group having 1 to 18 carbon atoms and need not be the same throughout the same promoter molecule, Q is as defined in Formula I, $a$ is an integer of 1 to 3, preferably 2 to 3, $b$ and $c$ are each an integer of 0 to 2, and $a+b+c$ is 3. Because of their general low cost and availability, promoters as defined in Formulas I through IV above wherein Q is oxygen are preferred.

The application of this invention is not limited to any particular class or type of organopolysiloxane but is broadly applicable to all classes and types such as those covered by the formula:

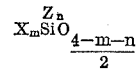

wherein X is a group selected from the class consisting of hydrogen, monovalent hydrocarbon groups of 1 to 18 carbon atoms and substituted monovalent hydrocarbon groups of 1 to 18 carbon atoms substituted with a group from the class consisting of cyano, amino, nitro, fluoro, chloro, bromo, polyoxyalkylene, alkoxy and aryloxy groups; Z is a group from the class consisting of —OX and —NX$_2$ wherein X is as defined above, $m$ is an integer of 0 to 3, $n$ is an integer of 0 to 3 and $m+n$ is an integer of 1 to 3. X and Z may be the same or different in each unit or in each molecule.

The organopolysiloxanes used herein thus contain in their molecules —$SiO_{3/2}\equiv$, =SiO= or $\equiv SiO_{1/2}$— units as defined by Formula V or mixtures of two or more such units. These organopolysiloxanes can also contain small amounts of tetrafunctional units SiO≡ in addition to the units specified above.

Typical groups represented by X include alkyl and substituted alkyl, e.g., methyl, ethyl, (beta-cyano)ethyl, (beta-(polyoxyethylene)ethoxy)ethyl, (beta-phenoxy)ethyl, (beta-phenyl)ethyl, (beta-phenyl-beta-methyl)ethyl, (beta-t-butyl)ethyl, (beta-trifluoromethyl) ethyl, propyl, (beta-cyano)propyl, (gamma-cyano)propyl, (gamma-amino)propyl, (gamma-t-butoxy) propyl, butyl, (delta-amino)butyl, (gamma-cyano-gamma-methyl)butyl, amyl, octyl, cyclopentyl, cyclohexyl, cycloheptyl, alkenyl and substituted alkenyl, e.g., vinyl, allyl, beta-phenylvinyl, 3-cyclohexenyl, aryl and substituted aryl, e.g., phenyl, 3-nitrophenyl, 4-cyanophenyl, dibromophenyl, 3-aminophenyl, 4-trifluoromethylphenyl, diphenyl, naphthyl, alkaryl, e.g., tolyl, xylyl, ethylphenyl, vinylphenyl, aralkyl, e.g., benzyl and the like. Typical hydrolyzable groups represented by Z include hydroxy, alkoxy, e.g., ethoxy, methoxy, aryloxy, e.g., phenoxy, —$NH_2$, N-alkylamino, e.g., —NHMe, —NHEt,

—$NHC_4H_9$

N-arylamino, e.g., —$NHC_6H_5$, N,N-dialkylamino, e.g., —$NMe_2$, —$NEt_2$, —$N(C_4H_9)_2$, N,N-diarylamino, e.g., —$N(C_6H_5)_2$ and the like.

Siloxane rearrangement is known to be a reversible process, i.e., low molecular weight organopolysiloxanes are convertible to high polymer and, conversely, high polymer can be reverted to siloxane entities possesing a lower degree of polymerization. Such rearrangements will continue in the presence of a suitable rearrangement catalyst, e.g., a basic catalyst, until an equilibrium mixture of a variety of siloxanes is formed. For example, in systems comprising mainly difunctional siloxy units, with or without monofunctional siloxy units, such equilibrium mixtures, in general, contain a relatively minor amount of cyclic siloxanes as well as higher molecular weight linear siloxanes. The proportion of cyclic siloxanes in the equilibrium mixture varies from system to system, depending in large part on the nature of organic substituents on silicon of the siloxane being rearranged. So long as materials catalytic to the rearrangement remain in the system, cyclic siloxanes removed from the system create an unbalance in the equilibrium and further rearrangement occurs to strive to replenish the amount of cyclics removed and again achieve an equilibrium. Continued removal of the cyclics will eventually consume most or substantially all of the siloxane in the system. Dilution of the system with a solvent also favors the formation of larger amounts of cyclics in the equilibrium mixture. On the other hand, if the basic catalyst becomes inactive when the equilibrium mixture is attained or during rearrangement before or after the equilibrium mixture is attained, relatively low-boiling materials including cyclics can be removed by solvent extraction, sparging or vacuum stripping without additional formation of cyclics.

The primary utility of the promoters described herein is to enhance the rate of siloxane rearrangement of siloxane systems not in equilibrium and thus capable of rearrangement. The novel promoter-catalyst compositions disclosed herein can be applied to the greatly accelerated conversion of high molecular weight polysiloxanes to polysiloxanes of lower molecular weight. The promoters, in combination with a persistent basic catalyst, are advantageously employed in increasing the velocity of conventional processes for preparing diorganocyclopolysiloxane intermediates by rearrangement of mixtures of higher polysiloxanes. Moreover, mechanical incorporation of such promoter-catalyst compositions, and subsequent moderate heat treatment, enable replasticization of cured silicone elastomers to a more useful state.

Hence the compositions and method of this invention are not only useful in preparing polymeric organopolysiloxanes of moderate to extremely high degrees of polymerization but are also adaptable in rearranging high organopolysiloxanes, which may be linear or crosslinked, to useful polysiloxanes of moderate to low molecular weight.

The promoters of this invention by themselves have no catalytic effect on siloxane rearrangement. However, compositions, which are mixtures of a base and promoter, when admixed with an organopolysiloxane, greatly increase the rate of siloxane rearrangement over that rate obtainable with the same amount of base alone, under identical conditions. The use of these compositions of base and promoter also permits the attainment of useful rates of siloxane rearrangement at reduced temperatures, often at room temperature and below.

Furthermore, the base-promoter compositions of this invention exhibit unexpected and advantageous modes of behavior in rearranging organopolysiloxanes. Compositions consisting of base and a promoter having organo groups attached only through carbon or nitrogen to phosphorus, such as those defined in Formulas II and III above, are persistent with time in effecting siloxane rearrangements. Therefore, promoters of this type are herein called persistent promoters.

In contrast, compositions consisting of base and a promoter having at least one and preferably three alkoxy groups attached to phosphorus, such as those defined in Formula IV above, exhibit an unusual self-limiting effect in that at a given temperature the addition of such compositions to an organopolysiloxane at first causes a rapid siloxane rearrangement and after a period of time becomes inactive and no longer causes rearrangement even at higher temperatures. Therefore, promoters of this type are herein called transient promoters. This effect occurs with both the alkali metal bases and the quaternary bases. The alkali metal bases alone in a siloxane system remain active indefinitely within the temperature range in which they are normally used. The quaternary bases alone in a siloxane system are subject to an auto decomposition which becomes more rapid as the temperature increases. However, within the temperature range in which they are normally used by themselves for siloxane rearrangements, the active life of the quaternary bases is much longer than when they are combined with the promoters described herein under otherwise equivalent conditions. Thus, in the case of the quaternary bases the self-limiting effect exhibited by my compositions appears to be primarily due to the reaction, at the somewhat elevated temperatures used for rearrangement, of base with promoter rather than the much slower auto decomposition effect inherent in the quaternary base alone. By this means, organopolysiloxanes can be rearranged at a constant moderately elevated temperature to form stable products without need for deactivation of catalyst at higher temperatures or other procedures for physical or chemical separation of the catalyst. The use of transient promoters is particularly valuable where the starting organopolysiloxane contains heat sensitive organo groups or where rearrangement must be conducted in inaccessible locations. Mixtures of transient and persistent promoters can be used as a means of regulating the rearrangement for the production of a wide range of stable high polymers.

The promoters found to have this unexpected and unusual advantage include those defined by Formula IV above and preferably include compounds selected from the group consisting of tertiary organo phosphorus oxides, sulfides and selenides having from 1 to 3, preferably 2 to 3, alkoxy groups attached to phosphorus and wherein the remaining organo groups are attached through carbon or nitrogen to phosphorus, for example, $$(R'''')_2(R''''O)P(Q)$$
$$R''''(R''''O)_2P(Q)$$
$$(R''''O)_3P(Q)$$
$$(R_2''''N)(R''''O)_2P(Q)$$
$$(R_2''''N)_2(R''''O)P(Q) \text{ and}$$
$$R''''(R_2''''N)(R''''Q)P(Q)$$

wherein $R''''$ is as defined above and need not be the same throughout the same molecule and Q is as defined above.

In the practice of this invention, the base and the promoter may be mixed together in any desired ratio and the resulting promoter-catalyst composition added to the organopolysiloxane in any desired amount. Alternatively, the base and the promoter may be added separately in either order to the organopolysiloxane. In certain applications it may be desirable to add the base to the organopolysiloxane first and begin the siloxane rearrangement and then at a later time to mix the promoter with the rearranging base-organopolysiloxane mixture to obtain an increased rate of siloxane rearrangement or to maintain the original rate of rearrangement while lowering the temperature of the system.

Since the base and promoter may be combined before adding to the organopolysiloxane or may be added separately and in either order, it is convenient to specify the relative amounts of base and promoter with respect to the starting organopolysiloxane. The amount of base which can be used is not rigorously limited; it will seldom be less than 1 part or more than 5000 parts by weight of cation, i.e., alkali metal ion, tetraalkylammonium ion, tetraalkylphosphonium ion, trialkylhydrazinium ion or trialkylguanidinium ion of the promoter, per million weight parts of starting organopolysiloxane and preferably will be from about 5 parts to 1000 parts per million. The amount of promoter used may also vary widely. Useful gains in rate will seldom be obtained with less than about 0.1 percent by weight based on the organopolysiloxane while in other instances the promoter can be used in amounts up to about 2000 weight percent based on the organopolysiloxane when it is desired to maximize the cyclic content of the rearranged product. Preferably, the amount of promoter will be from about 0.5 percent to 500 percent. The catalytic composition may consist of a combination of a single base with a single promoter or may consist of combinations of more than one base with more than one promoter, as desired.

Alkaline earth metal bases, by themselves, are well known to have no significant catalytic activity toward organopolysiloxane rearrangement under conditions conventionally employed for such reactions, i.e., at temperatures up to 200° C. This should not be confused with the moderate catalytic activity of such substances toward the condensation of silanols. The most recent reference to this absence of catalytic activity toward organosiloxane rearrangement is R. L. Merker U.S. Patent 3,202,634. Such alkaline earth metal bases include the oxides, hydroxides, alkoxides, aryloxides and organosilanolates of the metals of Group II A of the Periodic Table of Elements, e.g., beryllium, magnesium, calcium, strontium, barium and radium.

It has been discovered that certain alkaline earth metal bases in the presence of certain types of organophosphorus promoters, unexpectedly become significantly active catalysts for organopolysiloxane rearrangement. Thus, the strontium and barium oxides, hydroxides, alkoxides, e.g., ethoxides, aryloxides, e.g., phenoxides, and silanolates, e.g., dimethylsilanolates, when used in combination with promoter of Formulas II and III above show catalytic activity toward organopolysiloxane rearrangement. The relative proportions of such bases and promoters employed to effect rearrangement are in the same ranges set forth above for the alkali metal and quaternary bases.

Silanol terminated siloxane fluids are currently and potentially useful in a wide variety of applications. However, at present, few, if any, practical, economical and versatile routes are available for producing organopolysiloxanes containing silanol groups. For example, U.S. Patent 2,607,792 discloses a method utilizing high temperatures, 200–400° C., high pressures, at least 225 p.s.i., and reaction times of the order of 3 to 12 hours at such elevated temperatures and pressures, to form relatively low viscosity fluids. U.S. Patent 2,863,897 discloses a method utilizing alkylnitriles in a closed system and moderate temperatures, not over 175° C., for extended periods of 1 to 6 days or more.

It has been discovered that organopolysiloxanes and water undergo rearrangement to afford silanol terminated fluids under mild conditions in the presence of promoters and base catalysts disclosed herein. More specifically, the promoters, in combination with the base catalysts disclosed herein possess beneficial characteristics for effecting the reaction between diorganocyclosiloxanes and water to produce higher molecular weight, silanol end-blocked organopolysiloxanes. The reasons for employing promoters are threefold as follows:

(1) they provide a solvent medium for the reactants
(2) they inhibit silanol condensation, and
(3) they enhance the reaction between the organopolysiloxane and water.

The amount of water employed is not narrowly critical and generally depends on the molecular size desired for the organopolysiloxane product. Since water operates to produce end-blocking silicon-bonded hydroxyl groups, the higher amounts of water result in lower molecular weight organopolysiloxanes and the lower amounts of water result in higher molecular weight products under otherwise equivalent conditions. The proportions of promoter and catalyst employed to produce the silanol end-blocked product are as set forth above and the amount of promoter used can be so high that it performs as a solvent in the system. The water can be replaced with alkanols, preferably having 1 to 18, preferably 1 to 10, carbon atoms, for the production of siloxanes having silicon-bonded alkoxy groups.

Attempts have been made in the past to produce filled silicone polymers by rearranging low molecular diorganocyclosiloxane polymers in the presence of high surface area silica fillers. These efforts have been successful when acidic catalysts were employed but have met with failure when alkaline catalysts were used. The apparent reason for this kind of behavior can be ascribed to the acidic nature of the silica filler. The silanol groups present on the silica surface are sufficiently acidic to effectively neutralize minor amounts of basic substances such as those used to induce rearrangement. Hence, rearrangement catalysts which are alkaline are thought to be rendered inactive in such an acidic environment. Consequently, silica filled siloxane polymers could not be heretofore produced in situ by employing basic catalysts in the conventional manner.

It has been discovered that by introducing a promoter, such as those described herein, into a dispersion of a filler, such as silica, in a low molecular diorganocyclosiloxane or mixtures thereof, the rearrangement is accelerated to an extent sufficient to permit base-catalyzed rearrangement to proceed before the catalyst is inactivated by the acidic filler. When rearrangement has proceeded to a substantial degree, a highly viscous, opaque substance resembling a grease is obtained. In this manner it is now possible to produce antifoam bases which function as relatively durable antifoams in a highly alkaline medium. The amount of filler employed is not narrowly critical and, in general, is similar to those amounts used in making similar products. Preferably, the amount of filler employed ranges from about 0.1 to 20.0, preferably 0.1 to 10.0, weight percent based on the organopolysiloxane employed.

Typical examples of specific base catalysts which are employed herein are sodium, potassium and cesium hydroxides, sodium potassium and cesium oxides, sodium, potassium and cesium methoxides, ethoxides, phenoxides and butoxides, sodium, potassium and cesium salts of methylsilanetriol,
dimethylsilanediol, and
phenylsilanetriol,
tetramethylammonium hydroxide,
tetraethylammonium hydroxide,
phenyltrimethylammonium hydroxide,
triethyloctadecylammonium hydroxide,
benzyltrimethylammonium hydroxides,
cyclohexyltributylammonium hydroxide,
vinyltrimethylammonium hydroxide,
benzyl beta-hydroxyethyldimethylammonium hydroxide,
tolyltriethylammonium hydroxide,
tris-(beta-hydroxyethyl)methylammonium hydroxide,
12-hydroxyoctadecyltrimethylammonium hydroxide,
hydroxyphenyltriethylammonium hydroxide,
hydroxycyclohexyltributylammonium hydroxide,
hydroxyphenylhydroxyethyldimethylammonium
   hydroxide,
hydroxyphenylbenzyldibutylammonium hydroxide,
tetramethyl phosphonium hydroxide,
tetraethyl phosphonium hydroxide,
tetra-n-butyl phosphonium hydroxide,
dimethyldiethyl phosphonium hydroxide,
phenyltrimethyl phosphonium hydroxide,
butyltricyclohexyl phosphonium hydroxide,
tetramethyl phosphonium methoxide,
tetrabutyl phosphonium butoxide, etc., many examples of such quaternary phosphonium compounds being more particularly disclosed in U.S. Patent 2,883,366, issued Apr. 21, 1959, trimethylhydrazinium hydroxide, methoxide, n-butoxide and dimethylsilanolate, tri-n-butylhydrazinium hydroxide, ethoxide and phenylsilanolate, triethylguanidinium hydroxide, propoxide and methylsilanolate, and the like. Preferably the alkaline catalysts, which contain carbon, contain no more than 18 carbon atoms.

The transient nature of promoters covered by Formula IV renders them useful in controlling the degree of rearrangement without the necessity of employing neutralizing or deactivating agents, close temperature controls or other means of lesser convenience. Thus, by regulating the relative proportions of such promoters and the base catalyst in relation to the organopolysiloxane being rearranged and carrying out the rearrangement at a chosen temperature, it is possible to automatically stop the rearrangement at the desired extent. If desired, the rearrangement can be conducted in a stepwise manner by adding additional catalyst and repeating the sequence until the desired extent of rearrangement has been achieved.

If desired, solvents can be employed for convenience of handling and mixing the promoter, catalyst and organopolysiloxane. In general, however, they need not be used and especially are not desired when the rearrangement products are to be used per se, for example, as in the preparation of filled products such as greases. In many instances the promoters themselves, such as hexamethylphosphoramide, when used in large quantities function as solvents as well as in promoting rearrangement. Other solvents, such as, biphenyl, toluene, benzene, xylene, hexane and tetrahydrofuran and other relatively neutral solvents can be employed if practical or desired.

The following examples are presented wherein, unless otherwise specified, Me means methyl, Et means ethyl, Bu means butyl, Ph means phenyl, Oct means octyl, HMPA means hexamethylphosphoramide, TEP means triethylphosphate, TBPO means tributylphosphine oxide, TOPO means trioctylphosphine oxide, in Examples 14 through 17% OH designates the amount of silicon-bonded hydroxyl groups, temperatures are on the centigrade scale, viscosities given in Examples 5, 6, 9, 18 and 19 were measured with a Brookfield Synchro-Lectro Viscometer at 25° C. or other temperature if otherwise indicated, viscosities in Examples 13, 14 and 17 were measured with an Ostwald-Cannon Viscometer at the temperatures specified, all other viscosities were measured at 25° C. on either of these instruments which provide comparable measurements, and all weights and percentages are on a weight basis.

Example 1

This example illustrates the striking enhancement produced in the rate of rearrangement by employing a catalyst composition and method according to this invention.

Several solutions, each composed of 100 parts of octamethylcyclotetrasiloxane and various amounts as listed in Table I of the promoter, HMPA, were thoroughly purged with nitrogen to expel any trace of dissolved materials such as oxygen or carbon dioxide, which would inhibit rearrangement. Each solution was then catalyzed with 0.45 parts of a solution of potassium dimethyl silanolate in toluene containing 1.24% as potassium ion. The solutions were placed in an oil bath maintained at 50° C. The time required in each case to form a dimethylsiloxane polymer with a molecular weight in excess of 100,000 is tabulated in Table I.

When an identical solution containing no HMPA, however, was heated in the oil bath, no change in viscosity was apparent after 24 hours.

TABLE I

| Parts of HMPA: | Time (minutes) |
|---|---|
| 0.9 | 82 |
| 1.2 | 57 |
| 2.5 | 32 |
| 4.1 | 14 |

Example 2

This example illustrates the broad scope of temperatures which are operative in this invention in producing useful rates of siloxane rearrangement.

Several solutions, each composed of 100 parts of octamethylcyclotetrasiloxane and 1.2 parts of HMPA, were thoroughly purged with nitrogen. Each solution was then catalyzed with 0.45 parts of a solution of potassium dimethyl silanolate in toluene, containing 1.24% as potassium ion. The solutions were placed in several oil baths, each maintained at a different constant temperature as listed in Table II. The time required in each case to form a high molecular weight dimethylsiloxane polymer (e.g., in excess of $10^5$ cps.) is given in Table II.

By contrast, an identical solution containing no HMPA, however, when maintained at 90° C., exhibited no apparent change in viscosity after 24 hours. When this control was then further heated to 140° C., an immobile dimethylpolysiloxane gum formed after about 200 minutes.

TABLE II

| Temperature (° C.): | Time (minutes) |
|---|---|
| 23 | 480 |
| 40 | 80 |
| 50 | 45 |
| 65 | 20 |
| 90 | 6 |
| 140 | <1 |

Example 3

This example shows the efficacy of a variety of promoters, in combination with a base catalyst, in producing accelerated rates of siloxane rearrangement.

Several solutions, each composed of 100 parts of octamethylcyclotetrasiloxane and .024 mol of one of several different promoters as listed in Table III, were purged with nitrogen for a short period of time. Each solution was then catalyzed with 3.3 parts of a solution of potassium dimethyl silanolate dissolved in toluene containing 0.60% as potassium ion. The solutions were maintained at 70° C. in an oil bath until a substantial amount of rearrangement occurred as manifested by an appreciable viscosity increase (e.g., in excess of $10^4$ cps.). The results are summarized in Table III.

When an identical solution containing no promoter, however, was heated in the oil bath, no rearrangement occurred overnight. Conversely, a similar solution containing the promoter, HMPA, but containing no catalyst, when similarly heated, produced no rearrangement. In view of this evidence, it is essential that both ingredients, i.e., the promoter and catalyst, be present in the siloxane before accelerated rearrangement will ensue.

TABLE III

| Promoter | Common Structure | Weight, percent | Time, hrs. |
| --- | --- | --- | --- |
| Hexamethylphosphoramide | $(Me_2N)_3P(O)$ | 4.1 | 0.1 |
| Tri-n-butylphosphine oxide | $(n\text{-}Bu)_3P(O)$ | 5.2 | 0.1 |
| Tri-n-octylphosphine oxide | $(n\text{-}Oct)_3P(O)$ | 9.2 | 0.1 |
| Triethylphosphate | $(EtO)_3P(O)$ | 4.4 | 0.5 |
| Tri-n-butyl phosphate | $(n\text{-}BuO)_3P(O)$ | 6.4 | 0.5 |
| O,O,O-triethylthiophosphate | $(EtO)_3P(S)$ | 4.8 | 2 |
| Tetraethylpyrophospate | $(EtO)_2\overset{(O)}{P}\text{—}O\text{—}\overset{(O)}{P}(OEt)_2$ | 3.4 | 2 |
| Ethyl-O,O-diethylphosphonate | $(EtO)_2\overset{(O)}{P}\text{—}Et$ | 4.0 | 2 |
| Triphenylphosphine oxide | $(Ph)_3P(O)$ | 6.6 | 12 |
| Gamma-Picoline-N-oxide | 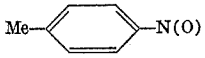 | 2.6 | 12 |

Example 4

This example exhibits the utility of a typical catalyst composition and method of this invention in producing rearrangement of a variety of diorganocyclopolysiloxanes to high polymers.

Several solutions, each composed of 100 parts of a diorganocyclopolysiloxane as listed in Table IV and 5 parts of HMPA, were sparged thoroughly with dry nitrogen. Each solution was then catalyzed with 0.8 part of a solution of potassium silanolate in HMPA, containing 0.72% potassium ion. The reaction mass was observed at ambient temperature for rearrangement. If no rearrangement occurred within 5 minutes then the active solutions were placed in an oil bath maintained at 70° C. and again observed for any indication of reaction. The times required to afford high molecular weight silicone polymers, as observed by a change in each case from a low viscosity liquid to a very high viscosity fluid or gum exhibiting very little flow, are shown in Table IV.

TABLE IV

| Diorganocyclopolysiloxane | Time (minutes) |
| --- | --- |
| $(Me_2SiO)_4$ | 5 |
| $(Me_2SiO)_5$ | 5 |
| $(EtMeSiO)_3$ | 12 |
| $(EtMeSiO)_4$ | 10 |
| $(Et_2SiO)(Me_2SiO)_3$ | 5 |
| $(Et_2SiO)_3$ | 11 |
| $(NC(CH_2)_3MeSiO)(Me_2SiO)_3$ | 5 |
| $(CF_3CH_2CH_2MeSiO)_3$ | Instantaneous [1] |

[1] High polymer formed at ambient temperature (25° C.).

Example 5

This example demonstrates the utility of several typical catalyst compositions, disclosed herein, in preparing, by rearrangement, fluid dimethylpolysiloxanes endblocked with trimethylsiloxy units.

Three solutions, each composed of 70.2 parts of octamethylcyclotetrasiloxane, 8.2 parts of dodecamethylpentasiloxane and 3 parts of the monomer listed in Table V, were sparged with dry nitrogen. Each solution was then catalyzed with 0.75 part of a solution of potassium silanolate in toluene, containing 0.92% as potassium ion. All three solutions were maintained at 70° C. for 24 hours. After the elapsed time, the solution was removed and cooled to ambient temperature. The viscosity of each solution is given in Table V.

In a parallel experiment, except in the absence of promotor, no indication of rearrangement was apparent after several days.

TABLE V.—VISCOSITY (CENTIPOISES AT 25° C.)

| | Triethyl Phosphate | Trioctyl Phosphine Oxide | Hexamethyl Phosphoramide |
| --- | --- | --- | --- |
| At start | 4 | 4 | 4 |
| After 24 hours at 70° C | 48 | 49 | 60 |

Example 6

This example demonstrates the utility of two typical catalyst compositions disclosed herein in preparing, by rearrangement, fluid dimethylpolysiloxanes chain stopped with ethoxy units.

Two solutions, each composed of 73.5 parts by weight of octamethylcyclotetrasiloxane, 4.2 parts by weight of dimethyldiethoxy silane and 3 parts of the promotor listed in Table VI, were thoroughly purged with dry nitrogen. Each solution was then catalyzed with 0.25 part of solution of potassium silanolate in toluene, containing 0.92% as potassium ion. Both solutions were maintained at 70° C. for 24 hours. After the elapsed time, the solutions were removed and cooled to ambient temperature. The viscosity of each solution is given in Table VI.

In a parallel experiment, except omitting the promoter, rearrangement was not evident after a week.

TABLE VI.—VISCOSITY (CENTIPOISES AT 25° C.)

| | Triethyl Phosphate | Trioctyl Phosphine Oxide |
| --- | --- | --- |
| At start | 4 | 4 |
| After 24 hours at 70° C | 44 | 46 |

Example 7

This example illustrates the preparation and evaluation of cured organopolysiloxane elastomers in accordance with my claimed invention.

A solution of 5 parts of triethyl phosphate and 0.2 part of methyl vinyl siloxane, having a molecular weight of 336 and the approximate formula of $(MeViSiO)_4$, dissolved in 100 parts of octamethylcyclotetrasiloxane was thoroughly purged with dry nitrogen. A sample of similar composition, omitting triethyl phosphate, was prepared as a control. Each solution was catalyzed with 0.4 part of tetramethylammonium silanolate catalyst containing 2.5% as tetramethylammonium ion. Both compositions were simultaneously placed in a 90° C. constant temperature bath; after 2 hours both were removed. The resultant gumstocks were compounded on a roll mill according to the following recipe:

| Ingredient: | Parts |
| --- | --- |
| Polysiloxane gumstock | 100 |
| Cab-O-Sil HS–5 [1] | 40 |
| Lupersol 101 [2] | 0.8 |

[1] Pyrogenic silica, Cabot Corporation, Cambridge, Mass.
[2] 2,5-dimethyl-2,5-di(t-butylperoxy)hexane.

This mixture of ingredients was mold cured under pressure for 20 minutes at 175° C. and post cured in a forced draft air oven for 24 hours at 250° C. The rubber product obtained after mold curing and post curing was tested at ambient temperature for tensile strength and elongation on an Instron Testing Machine (Table VIII).

TABLE VII

|  | Control Specimen | Test Specimen |
| --- | --- | --- |
| Gumstock Intrinsic Viscosity [1] | 2.2 | 2.4 |
| Mold Cured Physical Properties: |  |  |
| Tensile (p.s.i.) | 1,070 | 1,020 |
| Elongation (percent) | 590 | 630 |
| Post Cured Physical Properties: |  |  |
| Tensile (p.s.i.) | 990 | 980 |
| Elongation (percent) | 410 | 470 |

[1] The intrinsic viscosity of the respective gums was measured in toluene solvent at 25° C.

Example 8

This example demonstrates the persistent and transient nature of the different catalyst compositions disclosed in this invention when used to prepare elastomeric products.

In each of of three jarred containers, one part of a promoter as listed in Table VIII was dissolved in 100 parts of octamethylcyclotetrasiloxane. Each container was thoroughly flushed with dry nitrogen, activated with 0.75 part of catalyst solution of potassium dimethyl silanolate in toluene containing 0.60% as potassium ion, and placed in an oven at 90° C. overnight. The elastomeric products or gumstocks were thus obtained and were then subjected to additional heat (200° C.) and reduced pressure (0.033 atmospheres) for approximately one and one-half hours. On removal from the oven after the elapsed time, weight losses were measured on each sample. The results are recorded in Table VIII.

TABLE VIII

| Promoter: | Weight loss in percent |
| --- | --- |
| Triethylphosphate (TEP) | 23 |
| Hexamethylphosphoramide (HMPA) | 80 |
| Tributylphosphine Oxide (TBPO) | 67 |

The relatively low weight loss of the TEP promoted gumstock is typical of a stabilized conventional dimethyl siloxane elastomer prepared by rearrangement. Evidently, the TEP, after promoting rearrangement of the cyclic siloxane to a high polymer, deactivated the catalyst and inhibited any further rearrangement. The HMPA and TBPO promoted gumstocks exhibited abnormally high weight losses. Evidently, the catalyst remained active in the system, hence permitting the reversion of high polymer to volatile low molecular weight products to occur.

Example 9

This example demonstrates the persistent and transient nature of the different catalyst compositions described herein, when utilized to prepare fluid silicone polymers.

Four percent (4%) of triethylphosphate (TEP), based on the weight of total siloxane present, was added to a mixture composed of 75.0 parts of octamethylcyclotetrasiloxane and 3.5 parts of hexamethyl disiloxane. Similarly, a solution of the same composition was prepared with the exception that trioctylphosphine oxide (TOPO) was substituted for TEP. Each of the two solutions was subdivided into four portions. All eight samples were thoroughly sparged with dry nitrogen, catalyzed with 0.75 part of a solution of potassium dimethyl silanolate in toluene solvent, containing 0.92% as potassium ion, and finally placed in an oil bath maintained at 70° C. After a predetermined time period had elapsed, two solutions, one containing TEP and the other TOPO, were removed from the bath and cooled to ambient temperature. The viscosity of each sample was measured. This procedure was repeated until all of the samples had been removed from the bath. The viscosities are tabulated in Table IX as a function of time for each promoter.

By inspection of Table IX and comparison with Table V (the molar ratios of $(Me_2SiO)$ to $(Me_3SiO)$ in both examples are equivalent), it is quite obvious that the TEP promoted experiments in the able V did not reach a constant viscosity. The rearrangement was automatically aborted because the catalyst composition had evidently been deactivated. By introducing additional catalyst to the reaction vessel, rearrangement did continue for a period of time before it had again stopped. Thus, the system displays the unique feature of auto-deactivation. In this manner, stable organopolysiloxanes having any predetermined degree of polymerization can be afforded with persistent base catalysts and transient promoters, such as TEP.

TABLE IX

| TEP | | TOPO | |
| --- | --- | --- | --- |
| Time (days) | Viscosity (centipoise) | Time (days) | Viscosity (centipoise) |
| 2 | 4,350 | 3 | 67 |
| 6 | 4,760 | 4 | 49 |
| 9 [1] | 3,180 |  |  |
| 10 [2] | 2,200 |  |  |

[1] Sample recatalyzed with an additional 0.75 part of catalyst after the sixth day and allowed to rearrange for another 3 days.
[2] Sample recatalyzed with an additional 1.5 parts of catalyst after the ninth day and allowed to rearrange for another day.

Example 10

This example illustrates another aspect of this invention, namely the conversion of higher molecular weight, condensed polysiloxanes to useful polysiloxanes of low molecular weight.

Five hundred parts by weight of biphenyl, 500 parts of dimethyl siloxane hydrolyzate (polymeric condensation product of dimethyldichlorosilane with water), 50 parts of HMPA and 7.5 parts of potassium hydroxide were charged into a reaction vessel equipped with conventional vacuum distillation apparatus. The system was flushed with dry nitrogen gas for a short period of time then was evacuated to 0.4 atmospheres of pressure. Heat was slowly applied until the reaction mass commenced boiling. When the vapor temperature and rate of distillate removal, under virtually zero reflux, were constant, the time required to collect a measured amount of product was noted. The product was identified as a mixture of dimethylcyclic siloxanes corresponding to a degree of polymerization of 3 to 6.

The same experiment was repeated in the absence of HMPA. The average rate of product removal for the unpromoted depolymerization was 4.7 parts per minute while that for the promoted experiment was 9.0 parts per minute. Thus, a significant improvement in rate was realized in the presence of moderate quantities of promoter.

Example 11

This example demonstrates a method for reclaiming cured silicon gums and rubbers.

A peroxide cured, unfilled dimethylsiloxane gum, containing 0.02% methyl vinyl siloxane as crosslinking sites, was kneaded on a roll mill to a semi-plastic, somewhat friable mass and then subdivided into two portions of 100 parts each. 4.5 parts of a solution of potassium silanolate in HMPA, containing 0.72% as potassium ion in HMPA, were incorporated into the test portion while 5.4 parts of a solution of potassium silanolate in toluene were kneaded into the control. The samples were individually placed in separate capped containers and heated in an oven maintained at 70° C. Within a few hours the test sample exhibited signs of mobility while the control did not. In 24 hours the test specimen lost all dimensional stability and reverted into a workable plastic mass. On the other hand the control remained dimensionally stable, indicating that virtually no rearrangement had occurred.

Example 12

This example demonstrates the ability of certain types of organophosphorus promoters to unexpectedly impart catalytic activity to certain alkaline earth metal bases toward organosiloxane rearrangement.

A series of solutions, each composed of 100 parts by weight of octamethylcyclotetrasiloxane and 0.024 mol of a promoter as listed in Table X, were purged with nitrogen for a short duration then stoppered. The individual solutions were subsequently catalyzed with 0.0015 mol of one of the several catalysts tested as listed in Table X. Concurrently, samples with the promoter absent were also prepared for each corresponding catalyst. These were designated as control samples. All of the active solutions were placed in an oil bath, thermostated at 140° C. until a substantial amount of rearrangement occurred, as manifested by an appreciable viscosity increase. The approximate time in hours required to produce a high polymer in each solution is recorded in Table X.

Inspection of the tabulated data reveals that the control solution catalyzed with KOH rearranged to a high polymer as anticipated. In contrast, rearrangement was not evident in those controls catalyzed with LiOH, known to be a relatively poor rearrangement catalyst, and with the Group IIA hydroxides. However, when trace amounts of KOH were added, high polymer formed in the controls. This attested to the fact that the unreactiveness of the controls can be attributed to the inherent inactivity of the catalyst rather than to any extraneous factors such as the presence of contaminants which inhibit rearrangement.

Both of the Group IA hydroxides when used in combination with a promoter, rearranged the reactant siloxane to a high polymer.

On the other hand, only the barium and strontium bases of the Group IIA series in conjunction with the HMPA and TBPO promoters caused rearrangement to occur to a perceptible degree. However, these bases were not active in the presence of triethylphosphate, a transient promoter. Moreover, addition of HMPA, which was found to be effective with these catalysts, did not appear to catalyze rearrangement in these samples, even after 24 hours. In the light of these results, the catalysts apparently were deactivated by reaction with the promoter before rearrangement commenced.

promoters, was also prepared for comparative purposes. The solutions were purged with nitrogen gas, stoppered, then immersed into a constant temperature bath maintained at 150° C. After 4 hours, the solutions were removed from the bath and their viscosities measured at 25° C. in an Ostwald-Cannon viscometer. The extent of condensation was manifested by an increase in viscosity as shown in Table XI.

TABLE XI

| | Viscosity (centistokes) |
|---|---|
| Control | 49 |
| HMPA | 60 |
| TEP | 30 |
| TBPO | 53 |

The relatively insignificant change in viscosity indicates that promoters per se are not active condensation catalysts.

A series of solutions similar to those prepared above were each catalyzed with 0.80 part of potassium silanolate containing 0.63% as potassium and subsequently subjected to the procedures described above; the results are tabulated in Table XII.

TABLE XII

| | Viscosity (centistokes) |
|---|---|
| Control | ∞ |
| HMPA | 71 |
| TEP | 192 |
| TBPO | 138 |

The control condensed to a very high molecular weight polymer as indicated by the infinite viscosity value. In the presence of the promoters, the viscosity did not increase to any appreciable degree.

Thus, the promoters virtually suppress silanol condensation even in combination with active basic condensation catalysts.

Example 14

This example illustrates the striking enhancement produced in the rate of rearrangement by employing a typical catalyst composition and method disclosed in this invention.

A reaction vessel was charged with 61.2 parts of mixed cyclic dimethyl siloxane nominally comprised of 10% hexamethylcyclotrisiloxane and 90% octamethylcyclotetrasiloxane, 1.9 parts of water and 37.0 parts HMPA. The reaction vessel was thoroughly purged for at least 15 minutes with nitrogen gas to expel traces of dissolved substances such as carbon dioxide which would inhibit the

TABLE X

| | Promoter | Group IA Hydroxides | | Group IIA Hydroxides | | | |
|---|---|---|---|---|---|---|---|
| | | KOH | LiOH | Ba(OH)$_2$ | Sr(OH)$_2$ | Ca(OH)$_2$ | Mg(OH)$_2$ |
| Weight Percent: | | | | | | | |
| 0.0 | Control | 0.5–1 | N.R. | N.R. | N.R. | N.R. | N.R. |
| 4.1 | HMPA (persistent) | 0.01 | 0.5 | 2 | 4 | | |
| 5.2 | TBPO (persistent) | 0.01 | 1 | 1 | 3 | N.R. | N.R. |
| 4.4 | TEP (transient) | 0.05 | 1.5 | N.R. | N.R. | | |

N.R. No rearrangement observed even after 24 hours at 140° C.

Example 13

This example demonstrates the effectiveness of the promoters of this invention in inhibiting silanol condensation, even in the presence of an active condensation catalyst.

A series of solutions were each prepared by mixing 100 parts of a dimethylsiloxane polymer having a bulk viscosity of 48 centistokes, terminated with hydroxy groups present in a concentration of 2.3%, and 10 parts of the promotor listed in Table XI. A control, containing no reaction. Concurrently, the reactant charge was moderately agitated and heated to 30° C. Once a constant temperature of 30° C. had been achieved, 0.25 part of potassium silanolate catalyst containing 4.16% potassium was dispersed from a syringe into the homogeneous reaction solution.

The solution conspicuously thickened immediately after catalyst addition. After 5 minutes the reaction was arrested by the addition of one part of glacial acetic acid to neutralize the catalytically active base. The crude product was subsequently washed thrice with copious quantities of water, sparged with nitrogen for at least one hour at 150° C. and then characterized. The resulting product was a fluid, crystal clear and water white in appearance, contained 1.7% hydroxyl groups and had a viscosity of 60 centistokes. An infra-red spectrum of the product indicated the presence of linear dimethylsiloxane units in addition to hydroxyl groups.

By contrast, a similar experiment was conducted in the absence of HMPA. The reactants, viz., the mixed cyclic dimethylsiloxanes and water were totally incompatible, forming two separate phases. After the addition of potassium silanolate catalyst, no prominent change in viscosity was observed. Even after 2 days at 30° C., the mixture remained heterogeneous with no evidence of polymer formation.

Example 15

This example illustrates the ability of a variety of alkaline substances, in combination with HMPA, to induce the rearrangement of diorganocyclosiloxanes and water to form silanol end-blocked diorganopolysiloxanes at a very mild temperature.

Each of four reaction vessels, designated numbers one through four, was charged with 73.6 parts of mixed cyclic dimethylsiloxanes described in Example 14, and 24.4 parts of HMPA. The reaction vessels were purged with nitrogen gas for at least 15 minutes while under moderate agitation. Subsequently, 2.0 parts of aqueous catalyst solution as listed in Table XIII were introduced into each reaction mass with a syringe.

TABLE XIII

| Vessel | Catalyst | Catalyst Concentration (parts of catalyst per 100 part of water) |
|---|---|---|
| 1 | Tetramethylammonium hydroxide pentahydrate | 0.60 |
| 2 | Lithium hydroxide | 0.40 |
| 3 | Strontium hydroxide octahydrate | 2.05 |
| 4 | Barium hydroxide octahydrate | 8.25 |

Each solution perceptibly increased in consistency within minutes after the addition of the aqueous catalyst. The reaction was permitted to proceed at 30° C. for one hour. After the time had expired, the active catalyst was neutralized with 2 parts glacial acetic acid. The crude products were isolated and purified following the same procedure described in Example 14. The resulting polymers, which were crystal clear, transparent fluids of low viscosity, were analyzed for hydroxyl content. The weight percent hydroxyl for each fluid is given in Table XIV.

TABLE XIV

| Vessel: | Percent OH |
|---|---|
| 1 | 1.9 |
| 2 | 1.8 |
| 3 | 2.0 |
| 4 | 2.6 |

Example 16

This example shows the efficacy of TEP in combination with a base catalyst in producing hydroxy-terminated, diorganosiloxane polymers from diorganocyclosiloxanes and water under mild conditions.

A reaction vessel was charged with 59.6 parts of mixed cyclic dimethylsiloxanes as described in Example 14, 3.7 parts of water and 36.7 parts of TEP. The vessel was purged with an inert gas such as nitrogen for approximately 15 minutes while the reaction mass was stirred at a moderate rate. The vessel contents were heated to and held constant at 30° C. When the proper conditions were attained, 0.50 part of potassium silanolate catalyst containing 4.16% potassium was added to the homogeneous reaction solution.

The reaction was allowed to proceed for 20 hours to ensure the attainment of equilibrium. After the elapsed time, the active catalyst was neutralized with 1 part by weight of glacial acetic acid. The crude product was isolated and purified according to the directions mentioned in Example 14.

The final product was a transparent, clear fluid of moderate viscosity, having a hydroxyl content of 1.4%.

Example 17

This example exhibits the utility of a typical catalyst composition and method of this invention in producing rearrangement of a variety of diorganocyclosiloxanes with water to afford copolymeric silanol terminated fluids.

Each of three reaction vessels, designated numbers one, two and three, was charged with 53.3 parts of HMPA, 2.7 parts of water and 44.0 parts of a mixture of diorganocyclosiloxanes, whose composition is given in Table XV.

TABLE XV

| | Weight Percent | | |
|---|---|---|---|
| | 1 | 2 | 3 |
| Octamethylcyclotetrasiloxane | 97.0 | 94.7 | 85.0 |
| Octaphenylcyclotetrasiloxane | | 5.3 | 15.0 |
| 1,3,5,7-tetramethyl-1,3,5,7-tetravinylcyclotetrasiloxane | 3.0 | | |

The reaction vessels were purged with nitrogen gas for at least 15 minutes while under moderate agitation. Subsequently, 0.25 part of potassium silanolate catalyst containing 4.16% potassium was introduced into each of the reactant masses to induce rearrangement.

The viscosity of the solutions noticeably increased in each case immediately after catalysis. The reaction, however, was permitted to proceed at ambient temperature (23–26° C.) for 16 hours to ensure the attainment of equilibrium. After the elapsed time, the active catalyst was neutralized with 1 part of glacial acetic acid. The products were then isolated and purified following the same procedure described in Example 14.

The resulting polymers, which were water white, low viscosity fluids, were characterized. The properties for the individual fluids are listed in Table XVI.

TABLE XVI

| | Vessel | | |
|---|---|---|---|
| | 1 | 2 | 3 |
| Percent hydroxyl | 3.0 | 3.1 | 3.2 |
| Percent methylvinylsiloxane | 2.7 | | |
| Percent diphenylsiloxane | | 6.0 | 16.5 |
| Viscosity centistokes in 25° C | 48.2 | 56.0 | 76.7 |
| Index of refraction, $n_D^{25}$ | 1.4068 | 1.4160 | 1.4378 |

Example 18

This example demonstrates the ability of the promoter in combination with a basic catalyst to induce rearrangement in diorganocyclosiloxanes in the presence of a high surface area silica filler.

In a reaction vessel, 3 parts of a filler (Cab-O-Sil MS-5, Pyrogenic silica) was uniformly dispersed through vigorous agitation into a solution composed of 97 parts of mixed cyclic dimethylsiloxanes (described in Example 14), and 5 parts HMPA. The water thin slurry (140 centistokes at 28° C.) was heated under a slight nitrogen purge. When the temperature became constant at 150° C., 1.9 parts of potassium silanolate catalyst containing 4.16% as potassium were dispensed from a syringe into the agitated slurry. The solution conspicuously thickened immediately after introduction of the catalyst. The resulting substance, the product, after cooling to room temperature, was an opaque grease. The viscosity at 28° C. was about 100,000 centistokes.

By contrast, a similar experiment was conducted in the obsence of HMPA. On addition of potassium silanolate in the same concentration as used above, no prominent change in viscosity was observed even after one hour (145 centistokes at 27° C.).

Example 19

This example exhibits the broad variety of conditions which can be employed to produce filled high polymeric siloxanes in situ.

Eight tests were made separately in reaction vessels. In each test, 3 parts of Cab-O-Sil MS-5 filler were uniformly dispersed through vigorous agitation into a solution of the siloxane listed in Table XVII and HMPA. The type and amount of siloxane and the amount of HMPA are listed in Table XVII. In test number 8 water in the amount shown was also present. The slurry having a viscosity of 145 centistokes was then heated under a slight purge with stirring to the predetermined temperature of 150° C. except test number 5 which was 90° C. When a constant temperature was reached, the stated amount of catalyst as listed in Table XVII was dispensed by syringe into the reaction mass. The solutions in tests 2 through 8 conspicuously thickened in consistency within seconds after catalysis. The products in tests 2 through 8 were opaque substances varying in viscosity from fluid dispersions to greases.

The reactant compositions, conditions of operation and product viscosities measured at 25–28° C. are summarized in Table XVII. Inspection of the tabulated data leads to the conclusions that:

(1) The promoter is an essential ingredient in the system to engender rearrangement.

(2) Potassium silanolate is as effective catalytically as tetramethylammonium silanolate.

(3) Viscosity and therefore molecular weight can be conveniently controlled by the incorporation of end-blockers such as $Me_3SiO_{1/2}$ and $HO_{1/2}$.

(4) To produce a grease, rearrangement must be accelerated to the extent where it overcomes the rate of catalyst-filler interaction (deactivation of the catalyst). This is accomplished by adjusting temperature, promoter level and/or catalyst loading.

Example 20

This example illustrates the utility of the product so produced as antifoam bases.

Each of three reaction vessels, designated numbers one through three, was charged with 96 parts of mixed dimethylsiloxane cyclics (Example 14), 10 parts HMPA, and 4 parts silica filler. The reaction vessels were subsequently purged with a slow stream of nitrogen gas while under vigorous agitation. The reaction mass was then heated to and maintained at 90° C. At constant temperature, the catalyst in the amount of 500 p.p.m. as K or $(CH_3)_4N$ was introduced into the mass with a syringe. The composition of each starting mass and the high pH durability test results on the products are listed in Table XVIII.

TABLE XVIII

| Vessel No.: | Catalyst Type | Cab-O-Sil Filler Type | Durability (min.) |
|---|---|---|---|
| 1 | Potassium silanolate | MS 5 | 45 |
| 2 | Tetramethylammonium silanolate | MS 5 | 23 |
| 3 | do | HS 5 | 5 |

The products were all soft, opaque greases.

The high pH durability test (described in U.S. Patent 3,235,509) was conducted by placing into a 200 ml. round bottom flask equipped with a reflux condenser and containing a few boiling chips, 95 ml. of distilled water, 25 ml. of a 16% aqueous solution of sodium lauryl sulfate, 10 ml. of a 10% aqueous solution of sodium hydroxide and 0.6 ml. of a suspension composed of 1.0 gram of the antifoam base being tested in 10.0 ml. of toluene. The contents were heated to reflux. The time between incipient boiling (about 95° C.) and antifoam failure (persistence of stable foam high in condenser for 3.5 minutes) was recorded as the durability. A commercial antifoam base was tested for comparison and was found to have a durability of 2 minutes.

TABLE XVII

| | Siloxane | | Promoter, P.p.h.[2] | Catalyst | | Time, mins. | Viscosity, centistokes |
|---|---|---|---|---|---|---|---|
| | Type [1] | Parts | | Type [3] | P.p.m. as K or $N(CH_3)_4$ | | |
| Test No.: | | | | | | | |
| 1 | $(Me_2SiO)_{3-4}$ | 97 | 0 | K | 800 | 60 | 145 |
| 2 | $(Me_2SiO)_{3-4}$ | 97 | 5 | K | 800 | 60 | 76,000 |
| 3 | $(Me_2SiO)_{3-4}$ | 97 | 5 | K | 400 | 5 | 100,000 |
| 4 | $(Me_2SiO)_{3-4}$ | 97 | 5 | N | 400 | 5 | 100,000 |
| 5 | $(Me_2SiO)_{3-4}$ | 97 | 5 | K | 400 | 5 | 215 |
| 6 | $(Me_2SiO)_{3-4}$ | 97 | 2.5 | K | 400 | 5 | 1,500 |
| 7 | $(Me_2SiO)_{3-4}$ $Me_3SiOSiMe_3$ | 97 1.3 | 5 | N | 400 | 5 | 1,200 |
| 8 | $(Me_2SiO)_{3-4}$ $H_2O$ | 97 0.15 | 5 | N | 400 | 5 | 32,000 |

[1] $(Me_2SiO)_{3-4}$ is described in Example 14. The end-blocker, $[MeSiO_{1/2}]$, in test 7 was introduced as $Me_3SiO[Me_2SiO]_3SiMe_3$ but is expressed as $Me_3SiOSiMe_3$.
[2] Parts per hundred parts of siloxane-filler dispersion.
[3] K designates potassium silanolate and N designates tetramethylammonium silanolate.

Example 21

This example illustrates the ability of a base catalyst in combination with HMPA in one case and TEP in another case, to induce the rearrangement of diorganocyclosiloxanes and an alkanol, such as ethanol, to form alkoxysilyl end-blocked diorganopolysiloxanes at mild temperatures. Each of two reaction vessels is charged with 59.6 parts of mixed cyclic dimethylsiloxanes as described in Example 14, and 9.2 parts of ethanol. One vessel is charged with 36.7 parts of TEP and the other vessel is charged with 24.4 parts of HMPA. Each vessel is purged with an inert gas, such as nitrogen, for 15 minutes while the reaction mixture is stirred at a moderate rate. The vessel contents are heated to and held constant at 30° C. When the proper conditions are attained, 0.50 part of potassium silanolate catalyst containing 4.16% potassium is added to each of the homogeneous reaction solutions. The reaction is allowed to proceed for 20 hours to insure the attainment of equilibrium. After the elapsed time, the active catalyst is neutralized with 1 part of glacial acetic acid, and crude products are isolated and purified according to the directions mentioned in Example 14. The final products are transparent, clear fluids of moderate viscosity having an ethoxy content of about 3.5%.

What is claimed is:

1. In a process for effecting siloxane rearrangement wherein an organopolysiloxane is contacted with an alkaline rearrangement catalyst from the class consisting of alkali metal oxides, hydroxides, alkoxides, aryloxides, and silanolates; tetraalkylammonium hydroxides, alkoxides, and silanolates; tetraalkylphosphonium hydroxides, alkoxides and silanolates; trialkylhydrazinium hydroxides, trialkylguanidinium hydroxides, alkoxides, and silanolates, that improvement in promoting said rearrangement comprising, effecting said rearrangement in the presence of a promoter selected from the class consisting of organophosphorus compounds of the formula:

wherein Q is selected from the class consisting of oxygen, sulfur and silenium; Y and Y' when taken together comprise an alkylene group of 2 to 18 carbon atoms and when taken separately each contains no more than 18 carbon atoms and each are selected from the class consisting of monovalent hydrocarbon groups, alkoxy groups, diarylamino groups, substituted monovalent hydrocarbon groups, substituted alkoxy groups, substituted diarylamino groups and substituted dialkylamino groups, wherein the substituents of said substituted groups are selected from the class consisting of alkoxy, nitro, nitrile, nitroso, diarylamino and dialkylamino substituents, and wherein Y' can also represent a dialkylamino group; and W is a group selected from the class consisting of Y and Y' when they are taken separately; organo phosphorus compounds of the formula:

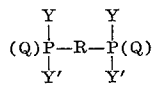

wherein Y, Y' and Q are as defined above and Y can also represent a dialkylamino group; and R is a member selected from the class consisting of divalent oxygen, divalent hydrocarbon groups of 2 to 12 carbon atoms, divalent substituted hydrocarbon groups of 2 to 12 carbon atoms substituted with a substituent selected from the class consisting of alkoxy, nitro, nitrile, nitroso, diarylamino and dialkylamino substituents, divalent polyoxyalkylene groups of 2 to 12 carbon atoms, divalent alkylene oxide groups, —R'O—, wherein R' is an alkylene radical of 2 to 12 carbon atoms, and divalent groups of the formula $$-NR'''N-$$
with R'' R'' wherein R'' is selected from the class consisting of monovalent hydrocarbon groups of 1 to 18 carbon atoms and substituted monovalent hydrocarbon groups of 1 to 18 carbon atoms substituted with the substituents as defined above and R''' is a divalent group selected from the class consisting of divalent hydrocarbon groups of 2 to 12 carbon atoms and substituted divalent hydrocarbon groups of 2 to 12 carbon atoms substituted with substituents as defined above; and when R contains carbon, the phosphorus atoms of said organophosphorus compounds are joined through at least two carbon atoms; pyridine N-oxide, and $C_1$ to $C_4$ alkyl substituted pyridine N-oxide.

2. The improvement as claimed in claim 1 wherein said promoter is an organophosphorus compound.

3. The improvement as claimed in claim 2 wherein said organophosphorus compound contains at least one phosphorus-bonded group selected from the class consisting of alkoxy groups and substituted alkoxy groups.

4. The improvement as claimed in claim 2 wherein said promoter is tri(n-butyl)phosphine oxide.

5. The improvement as claimed in claim 2 wherein said promoter is tri(n-octyl)phosphine oxide.

6. The improvement as claimed in claim 2 wherein said promoter is triethylphosphate.

7. The improvement as claimed in claim 2 wherein said promoter is tri-n-butylphosphate.

8. The improvement as claimed in claim 2 wherein said promoter is O,O,O-triethylthiophosphate.

9. The improvement as claimed in claim 2 wherein said promoter is tetraethylpyrophosphate.

10. The improvement as claimed in claim 2 wherein said promoter is ethyl-O,O-diethylphosphonate.

11. The improvement as claimed in claim 2 wherein said promoter is triphenylphosphine oxide.

12. The improvement as claimed in claim 1 wherein said promoter is gamma-picoline-N-oxide.

13. The improvement as claimed in claim 2 wherein said rearrangement is carried out at a temperature of about 25° C. to about 100° C.

14. The improvement as claimed in claim 2 wherein said organopolysiloxane is a relatively low molecular weight cyclic and is rearranged to a relatively high molecular weight organopolysiloxane.

15. The improvement as claimed in claim 2 wherein said organopolysiloxane is a mixture comprising a relatively low molecular weight cyclic and a relatively low molecular weight end-blocked linear organopolysiloxane and said mixture is rearranged to a relatively high molecular weight end-blocked organopolysiloxane.

16. The improvement as claimed in claim 2 wherein said organopolysiloxane is a relatively high molecular weight linear organopolysiloxane and is rearranged to a relatively low molecular weight organopolysiloxane.

17. The improvement as claimed in claim 2 wherein said organopolysiloxane is a relatively high molecular weight organopolysiloxane rubber and is rearranged to a relatively lower molecular weight organopolysiloxane.

18. The improvement as claimed in claim 2 wherein said rearrangement is conducted in the presence of water to produce a silanol end-blocked organopolysiloxane.

19. The improvement as claimed in claim 2 wherein said rearrangement is conducted in the presence of a filler.

20. The improvement as claimed in claim 14 wherein said relatively low molecular weight cyclic comprises octamethylcyclotetrasiloxane and said relatively high molecular weight organopolysiloxane is high molecular weight poly(dimethylsiloxane).

21. The improvement as claimed in claim 14 wherein said relatively low molecular weight cyclic comprises decamethylcyclopentasiloxane and said relatively high molecular weight organopolysiloxane is high molecular weight poly(dimethylsiloxane).

22. The improvement as claimed in claim 14 wherein said relatively low molecular weight cyclic comprises a trimer of the formula $(EtMeSiO)_3$ and said relatively high molecular weight organopolysiloxane is high molecular weight poly(ethylmethylsiloxane).

23. The improvement as claimed in claim 14 wherein said relatively low molecular weight cyclic comprises a tetramer of the formula $(EtMeSiO)_4$ and said relatively high molecular weight organopolysiloxane is high molecular weight poly(ethylmethylsiloxane).

24. The improvement as claimed in claim 14 wherein said relatively low molecular weight cyclic comprises a tetramer of the formula

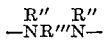

and said relatively high molecular weight organopolysiloxane is high molecular weight poly(diethylsiloxane-dimethylsiloxane).

25. The improvement as claimed in claim 14 wherein said relatively low molecular weight cyclic comprises hexaethylcyclotrisiloxane and said relatively high molecular weight organopolysiloxane is high molecular weight poly(diethylsiloxane).

26. The improvement as claimed in claim 14 wherein said relatively low molecular weight cyclic comprises a tetramer of the formula

[NC(CH₂)₃MeSiO][Me₂SiO]₃ and said relatively high molecular weight organopolysiloxane is high molecular weight poly(gamma-cyanopropylmethylsiloxanedimethylsiloxane).

27. The improvement as claimed in claim 14 wherein said relatively low molecular weight cyclic comprises a trimer of the formula (CF₃CH₂CH₂MeSiO)₃ and said relatively high molecular weight organopolysiloxane is high molecular weight poly(gamma-trifluoropropylmethylsiloxane).

28. The improvement as claimed in claim 15 wherein said mixture comprises octamethylcyclotetrasiloxane and dodecamethylpentasiloxane and said relatively high molecular weight end-blocked organopolysiloxane is trimethylsiloxy end-blocked poly(dimethylsiloxane).

29. The improvement as claimed in claim 15 wherein said mixture comprises octamethylcyclotetrasiloxane and hexamethyldisiloxane and said relatively high molecular weight end-blocked organopolysiloxane is trimethylsiloxy end-blocked poly(dimethylsiloxane).

30. The improvement as claimed in claim 16 wherein said high molecular weight linear organopolysiloxane is a dimethylsiloxane hydrolyzate obtained by condensing dimethyldichlorosilane with water and said low molecular weight organopolysiloxane is a mixture of cyclic poly(dimethylsiloxanes) having a degree of polymerization of 3 to 6.

31. The improvement as claimed in claim 17 wherein said rubber is a cured poly(dimethylsiloxanemethylvinylsiloxane) gum and said lower molecular weight organopolysiloxane is a workable plastic material.

32. The improvement as claimed in claim 18 wherein said organopolysiloxane is a mixture of hexamethylcyclotrisiloxane and octamethylcyclotetrasiloxane and said silanol end-blocked organopolysiloxane is silanol end-blocked poly(dimethylsiloxane).

33. The improvement as claimed in claim 18 wherein said organopolysiloxane is a mixture of octamethylcyclotetrasiloxane and 1,3,5,7-tetramethyl-1,3,5,7-tetravinylcyclotetrasiloxane and said silanol end-blocked organopolysiloxane is silanol end-blocked poly(dimethylsiloxanemethylvinylsiloxane).

34. The improvement as claimed in claim 18 wherein said organopolysiloxane is a mixture of octamethylcyclotetrasiloxane and octaphenylcyclotetrasiloxane and said silanol end-blocked organopolysiloxane is silanol end-blocked poly(dimethylsiloxanediphenylsiloxane).

35. Improvement as claimed in claim 19 wherein said filler is finely divided silica.

36. Improvement as claimed in claim 35 wherein said organopolysiloxane is a mixture of hexamethylcyclotrisiloxane and octamethylcyclotetrasiloxane and is rearranged to a poly(dimethylsiloxane) with said filler dispersed therein.

37. Improvement as claimed in claim 36 wherein said poly(dimethylsiloxane) is a grease.

38. Improvement as claimed in claim 36 wherein said poly(dimethylsiloxane) is a fluid.

39. Improvement as claimed in claim 36 wherein said mixture also contians hexamethyldisiloxane and said poly(dimethylsiloxane) is a trimethylsilyl end-blocked fluid.

40. Improvement as claimed in claim 36 wherein said mixture also contains water and said poly(dimethylsiloxane) is a silanol end-block fluid.

41. Improvement as claimed in claim 2 wherein said rearrangement is conducted in the presence of an alkoxysilane to produce an alkoxy end-blocked organopolysiloxane.

42. Improvement as claimed in claim 41 wherein said organopolysiloxane is octamethylcyclotetrasiloxane and said silane is dimethyldiethoxysilane.

43. Improvement as claimed in claim 2 wherein said promoter is a persistent promoter having the formula

R₃''''P(Q)

wherein R'''' is a monovalent hydrocarbon group having 1 to 18 carbon atoms and need not be the same throughout each promoter molecule and Q is selected from the class consisting of oxygen, sulfur and selenium.

44. Improvements as claimed in claim 2 wherein said promoter is a transient promoter having the formula:

(R''''O)ₐ(R'''')ᵦ(R₂''''N)꜀P(Q)

wherein R'''' is a monovalent hydrocarbon group having 1 to 18 carbon atoms and need not be the same throughout each promoter molecule, $a$ is 1 to 3, $b$ is 0 to 2, $c$ is 0 to 2, $a+b+c$ is 3 and Q is selected from the class consisting of oxygen, sulfur and selenium.

45. Improvement as claimed in claim 44 wherein $a$ is 3 and Q is oxygen.

46. Improvement as claimed in claim 43 wherein Q is oxygen.

47. Improvement as claimed in claim 43 wherein a compound selected from the class consisting of barium oxide, hydroxide, alkoxides, aryloxides, and silanolates and strontium oxide, hydroxide, alkoxides, aryloxides, and silanolates is employed as the alkaline rearrangement catalyst.

48. Improvement as claimed in claim 32 wherein said promoter is triethylphosphate.

49. The improvement as claimed in claim 2 wherein said organopolysiloxane comprises relatively low molecular weight cyclic and is rearranged to a high molecular weight organopolysiloxane gumstock.

50. Improvement as claimed in claim 49 wherein the promoter is a transient promoter having the formula (R''''O)₃P(Q)

wherein R'''' is a monovalent hydrocarbon group having 1 to 18 carbon atoms and need not be the same throughout each promoter molecule and Q is oxygen.

51. Improvement as claimed in claim 50 wherein the promoter employed is triethylphosphate.

52. Improvement as claimed in claim 51 wherein said organopolysiloxane comprises octamethylcyclotetrasiloxane and poly(methylvinylsiloxane).

53. Improvement as claimed in claim 45 wherein the degree of rearrangement is controlled by the relative amounts of said promoter and catalyst employed.

54. Improvement as claimed in claim 53 wherein the catalyst is added successively until the desired degree of rearrangement has been achieved.

55. Improvement as claimed in claim 45 wherein said catalyst is a transient quaternary base selected from the group consisting of tetraalkylammonium hydroxides, alkoxides and silanolates, tetraalkylphosphonium hydroxides, alkoxides and silanolates, trialkylhydrazinium hydroxides, alkoxides and silanolates, and trialkylguanidinium hydroxides, alkoxides and silanolates.

56. Improvement as claimed in claim 55 wherein $a$ is 3.

57. Improvement as claimed in claim 55 wherein said quaternary base is selected from the class consisting of tetraalkylammonium hydroxides, alkoxides and silanolates.

58. The improvement as claimed in claim 2 wherein said rearrangement is conducted in the presence of an alkanol having 1 to 18 carbon atoms to produce organopolysiloxane having silicon-bonded alkoxy groups derived from said alkanol.

59. The improvement as claimed in claim 58 wherein said organopolysiloxane is a mixture of hexamethylcyclotrisiloxane and octamethylcyclotetrasiloxane and said organopolysiloxane produced is poly(dimethylsiloxane) having silicon-bonded alkoxy groups.

60. The improvement as claimed in claim 2 wherein the alkaline rearrangement catalyst is selected from the class consisting of barium oxide, hydroxide, alkoxides, aryloxides, and silanolates and strontium oxide, hydroxide, alkoxides, aryloxides, and silanolates and wherein the promoter is a persistent promoter having the formula $$(R_2''''N)_3P(Q)$$

wherein R'''' is a monovalent hydrocarbon group having 1 to 18 carbon atoms and need not be the same throughout each promoter molecule and Q is selected from the class consisting of oxygen, sulfur and selenium.

61. The improvements as claimed in claim 60 wherein Q is oxygen.

62. The improvement as claimed in claim 61 wherein the promoter is hexamethylphosphoramide.

63. A promoter-rearrangement catalyst composition consisting essentially of an alkaline rearrangement catalyst selected from the class consisting of alkali metal oxides, hydroxides, alkoxides, aryloxides, and silanolates; tetraalkylammonium hydroxides, alkoxides, and silanolates; tetraalkylphosphonium hydroxides, alkoxides and silanolates; trialkylhydrazinium hydroxides, alkoxides and silanolates; and trialkylguanidinium hydroxides, alkoxides and silanolates, that improvement in promoting said rearrangement comprising, effecting said rearrangement in the presence of a promoter selected from the class consisting of organophosphorus compounds of the formula:

wherein Q is selected from the class consisting of oxygen, sulfur and selenium; Y and Y' when taken together comprise an alkylene group of 2 to 18 carbon atoms and when taken separately each contains no more than 18 carbon atoms and each are selected from the class consisting of monovalent hydrocarbon groups, alkoxy groups, diarylamino groups, substituted monovalent hydrocarbon groups, substituted alkoxy groups, substituted diarylamino groups and substituted dialkylamino groups, wherein the substituents of said substituted groups are selected from the class consisting of alkoxy, nitro, nitrile, nitroso, diarylamino and dialkylamino substituents and wherein Y' can also represent a dialkylamino group; and W is a group selected from the class consisting of Y and Y' when they are taken separately; organo phosphorus compounds of the formula:

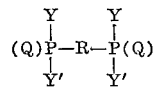

wherein Y, Y' and Q are as defined above and Y can also represent a dialkylamino group; and R is a member selected from the class consisting of divalent oxygen, divalent hydrocarbon groups of 2 to 12 carbon atoms, divalent substituted hydrocarbon groups of 2 to 12 carbon atoms substituted with a substituent selected from the class consisting of alkoxy, nitro, nitrile, nitroso, diarylamino and dialkylamino substituents, divalent polyoxyalkylene groups of 2 to 12 carbon atoms, divalent alkylene oxide groups, —R'O—, wherein R' is an alkylene radical of 2 to 12 carbon atoms, and divalent groups of the formula

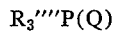

wherein R'' is selected from the class consisting of monovalent hydrocarbon groups of 1 to 18 carbon atoms and substituted monovalent hydrocarbon groups of 1 to 18 carbon atoms substituted with the substituents as defined above and R''' is a divalent group selected from the class consisting of divalent hydrocarbon groups of 2 to 12 carbon atoms and substituted divalent hydrocarbon groups of 2 to 12 carbon atoms substituted with substituents as defined above; and when R contains carbon, the phosphorus atoms of said organophosphorus compound are joined through at least two carbon atoms; pyridine N-oxide; and $C_1$ to $C_4$ alkyl substituted pyridine N-oxide, said catalyst being present in an amount providing $5 \times 10^{-6}$ weight percent to 500 weight percent of the cation of said catalyst based on the weight of said promoter.

64. Composition as claimed in claim 63 wherein said catalyst is present in an amount providing about 0.0001 weight percent to about 20 weight percent of the cation of said catalyst based on the weight of said promoter.

65. Composition as claimed in claim 64 wherein said promoter is an organophosphorus compound.

66. Composition as claimed in claim 65 wherein said promoter is a persistent promoter having the formula:

$$R_3''''P(Q)$$

wherein R'''' is a monovalent hydrocarbon group having 1 to 18 carbon atoms and need not be the same throughout each promoter molecule and Q is oxygen.

References Cited

UNITED STATES PATENTS

| | | | |
|---|---|---|---|
| 2,490,357 | 12/1949 | Hyde | 260—46.5 |
| 2,634,252 | 4/1953 | Warrick | 260—46.5 |
| 2,634,284 | 4/1953 | Hyde | 260—448.2 |
| 2,737,506 | 3/1956 | Hurd et al. | 260—46.5 |
| 2,739,952 | 3/1956 | Linville | 260—30.6 |
| 2,830,967 | 4/1958 | Nitzsche et al. | 260—46.5 |
| 2,837,494 | 6/1958 | Gilbert et al. | 260—37 |
| 2,863,897 | 12/1958 | Wehrly | 260—448.2 |
| 2,868,766 | 1/1959 | Johannson | 260—46.5 |
| 2,883,366 | 4/1959 | Kantor et al. | 260—46.5 |
| 2,947,771 | 8/1960 | Bailey | 260—448.2 |
| 3,002,951 | 10/1961 | Johannson | 260—46.5 |
| 3,175,995 | 3/1965 | Elliott et al. | 260—46.5 |
| 3,186,967 | 6/1965 | Nitzsche et al. | 260—46.5 |
| 3,234,174 | 2/1966 | Williams | 260—37 |
| 3,305,524 | 2/1967 | Brown et al. | 260—46.5 |
| 3,340,287 | 9/1967 | Spork | 260—448.2 |
| 3,398,117 | 8/1968 | Baronnier et al. | 260—46.5 |

DONALD E. CZAJA, Primary Examiner

M. I. MARQUIS, Assistant Examiner

U.S. Cl. X.R.

252—426, 428; 260—37, 448.2, 448.8

PO-1050
(5/69)

UNITED STATES PATENT OFFICE
CERTIFICATE OF CORRECTION

Patent No. 3,477,988          Dated November 11, 1969

Inventor(s) Robert L. Ostrozynski

It is certified that error appears in the above-identified patent and that said Letters Patent are hereby corrected as shown below:

Table A in column 3, lines 28 to 36 is incorrectly designated and should be corrected to read as follows:

Alkali Metal Bases:
- Lithium
- Sodium
- Potassium
- Rubidium
- Cesium

{ Oxides.
Hydroxides.
Alkoxides and aryl oxides (e.g methoxide, ethoxide, phenoxide
Silanolates (e.g. dimethylsila late.) }

Quaternary Bases
- Tetraalkylammonium
- Tetraalkylphosphonium
- Trialkylhydrazinium
- Trialkylguandinium { Hydroxides.
Alkoxides.
Silanolates. }

The Roman Numeral "VIII" in line 14 of column 15 is incorre and should be cancelled and corrected to read --VII--.

The expression "that improvement in promoting said rearrang comprising, effecting said rearrangement in the presence of" in lines 9 to 11 of claim 63 is in error and should be cancelled and replaced with the term --and--.

SIGNED AND
SEALED
MAY 26 1970

(SEAL)
Attest:

Edward M. Fletcher, Jr.
Attesting Officer

WILLIAM E. SCHUYLER, JR.
Commissioner of Patents